US012322261B2

(12) United States Patent
Reimer et al.

(10) Patent No.: US 12,322,261 B2
(45) Date of Patent: *Jun. 3, 2025

(54) PREMISES MONITORING USING ACOUSTIC MODELS OF PREMISES

(71) Applicant: The ADT Security Corporation, Boca Raton, FL (US)

(72) Inventors: Mark Reimer, Denver, CO (US); Shy Ward, Flower Mound, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,898

(22) Filed: Feb. 16, 2024

(65) Prior Publication Data

US 2024/0185697 A1 Jun. 6, 2024

Related U.S. Application Data

(63) Continuation of application No. 17/986,503, filed on Nov. 14, 2022, now Pat. No. 11,941,959.

(60) Provisional application No. 63/278,263, filed on Nov. 11, 2021.

(51) Int. Cl.
*G08B 13/16* (2006.01)
*G08B 13/08* (2006.01)

(52) U.S. Cl.
CPC ......... *G08B 13/1609* (2013.01); *G08B 13/08* (2013.01)

(58) Field of Classification Search
CPC ...... G08B 7/06; G08B 13/00; G08B 13/1681; G08B 13/1618; G10L 17/02
See application file for complete search history.

(56) References Cited

U.S. PATENT DOCUMENTS

| | | | | |
|---|---|---|---|---|
| 7,317,389 | B2 | 1/2008 | Yokota | |
| 9,872,088 | B2 | 1/2018 | Fadell et al. | |
| 10,964,193 | B2 | 3/2021 | Mandl et al. | |
| 2003/0090377 | A1 | 5/2003 | Pieper | |
| 2007/0183604 | A1* | 8/2007 | Araki | G10L 17/26 381/17 |
| 2009/0002490 | A1 | 1/2009 | Saito | |
| 2012/0087211 | A1 | 4/2012 | Lee et al. | |
| 2013/0162821 | A1* | 6/2013 | Park | G08B 13/19697 381/56 |
| 2019/0166802 | A1* | 6/2019 | Seltzer | A01K 27/001 |
| 2019/0362614 | A1* | 11/2019 | Mandl | G10L 25/51 |
| 2021/0006623 | A1* | 1/2021 | Joao | H04L 67/52 |

* cited by examiner

*Primary Examiner* — Mirza F Alam
(74) *Attorney, Agent, or Firm* — Weisberg I.P. Law, P.A.

(57) ABSTRACT

According to some embodiments, a control device for a premises security system that is configured to monitor a premises using a plurality of premises devices is provided. The control device is configured to obtain a plurality of acoustic samples for the premises, detect a sound anomaly in at least one of the plurality of acoustic samples, obtain a verification that the sound anomaly is expected, generate an acoustic model for the premises based at least on the plurality of acoustic samples and the verification that the sound anomaly is expected, receive data representing a detected sound during monitoring of the premises, compare the detected sound with the acoustic model for the premises to determine that the detected sound is unexpected, and initiate a premises security system alert based at least on the detected sound being unexpected.

20 Claims, 6 Drawing Sheets

PREMISES MONITORING USING ACOUSTIC MODELS OF PREMISES

CROSS-REFERENCE TO RELATED PATENT APPLICATION

This application is a continuation of and claims priority to U.S. Utility patent application Ser. No. 17/986,503, filed on Nov. 14, 2022, entitled PREMISES MONITORING USING ACOUSTIC MODELS OF PREMISES, which claims priority to U.S. Provisional Patent Application Ser. No. 63/278,263, filed Nov. 11, 2021, entitled ACOUSTIC FINGERPRINT, the entireties of both of which are incorporated herein by reference.

TECHNICAL FIELD

This disclosure relates to premises security systems and methods, and in particular to developing and using acoustic models of premises for premises security systems.

BACKGROUND

Existing premises security systems monitor a premises for predefined events that are typically associated with one or more specialized sensors. For example, a premises security system may trigger an intrusion alarm when a door contact sensor is triggered. Further, these existing premise security systems may have blind spots in that a specialized sensor (e.g., motion sensor, video analytics based sensor, etc.) may not be able to monitor an entire room due to a limited field of view or range and/or limited detectable characteristics of the event.

Further, some existing premises security systems may implement a sound sensor for detecting loud noises (e.g., breaking window) where an alarm is triggered based solely on the loud noise being greater than a noise threshold (e.g., dB threshold).

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
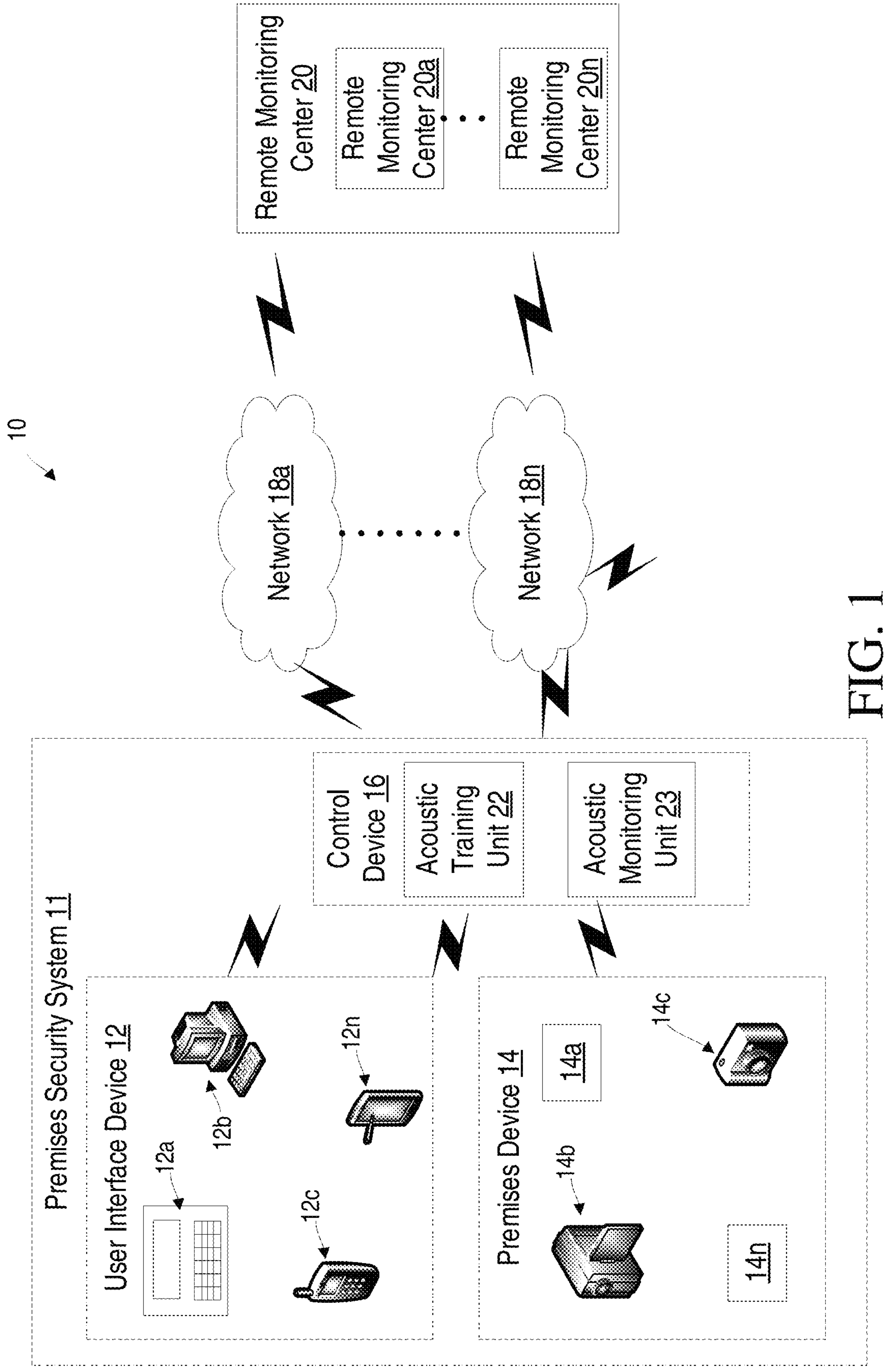
FIG. 1 is a diagram of an example system comprising a premises security system according to principles disclosed herein.

Before describing in detail exemplary embodiments, it is noted that the embodiments may reside in combinations of apparatus components and processing steps related to premises monitoring using acoustic models of premises. Accordingly, the system and method components have been represented where appropriate by conventional symbols in the drawings, focusing only those specific details that facilitate understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including," "has," and "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to the drawing figures in which like reference designators refer to like elements there is shown in FIG. 1 a system designated generally as "10." System 10 may include premises security system 11 where premises security system 11 includes and/or is associated with one or more user interface devices 12*a* to 12*n* (collectively referred to as "user interface device 12"), one or more premises devices 14*a* to 14*n* (collectively referred to as "premises device 14"), and control device 16. System 10 may further include one or more networks 18*a* to 18*n* (collectively referred to as "network 18"), and one or more remote monitoring centers 20*a* to 20*n* (collectively referred to as "remote monitoring center 20"), communicating with each other or with at least one other entity in system 10.

User interface device 12 may be a wireless device that allows a user to communicate with control device 16. User interface device 12 may be a portable control keypad/interface 12*a*, computer 12*b*, mobile phone 12*c* and tablet 12*n*, among other devices that allow a user to interface with control device 16 and/or one or more premises devices 14. User interface device 12 may communicate at least with control device 16 using wired or wireless communication protocols. For example, portable control keypad 12*a* may communicate with control device 16 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, user interface device 12.

Premises devices 14 may include one or more types of sensors, control and/or image capture devices. For example, the types of sensors may include various safety related sensors such as motion sensors, fire sensors, carbon monoxide sensors, flooding sensors and contact sensors, sound sensors (e.g., sound detectors), among other sensor types. For example, the sound sensors may include glass break sensors for detecting the sound of breaking glass, break-in sensors for detecting sounds above a predefined threshold such as a door breach, etc. The control devices 16 may include, for example, one or more lifestyle (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices. Premises device 14 may communicate with control device 16 via proprietary wireless communication protocols and may also use Wi-Fi, both of which are known in the art. Other communication technologies can also be used, and the use of Wi-Fi is merely an example. Those of ordinary skill in the art will also appreciate that various additional sensors and control and/or image capture devices may relate to life safety or lifestyle depending on both what the sensors, control and image capture devices do and how these sensors, control and image devices are used by system 10.

Control device 16 may provide one or more of management functions, acoustic model training and/or acoustic monitoring (inference) functions, analysis functions, control functions such as power management, premises device management and alarm management/analysis, among other functions to premises security system 11. In particular, control device 16 may manage one or more life safety and lifestyle features. Life safety features may correspond to security system functions and settings associated with premises conditions that may result in life threatening harm to a person such as carbon monoxide detection and intrusion detection.

Lifestyle features may correspond to security system functions and settings associated with video capturing devices and non-life-threatening conditions of the premises such as lighting and thermostat functions. Control device 16 includes acoustic training unit 22 for performing control device 16 functions such as acoustic determinations and analysis and functionality as described herein. Control device 16 includes acoustic monitoring unit 23 for performing control device 16 functions such as acoustic monitoring and functionality as described herein.

Control device 16 may communicate with network 18 via one or more communication links. In particular, the communications links may be broadband communication links such as a wired cable modem or Ethernet communication link, and digital cellular communication link, e.g., long term evolution (LTE) and/or 5G based link, among other broadband communication links known in the art. Broadband as used herein may refer to a communication link other than a plain old telephone service (POTS) line. Ethernet communication link may be an IEEE 802.3 or 802.11 based communication link. Network 18 may be a wide area network, local area network, wireless local network and metropolitan area network, among other networks. Network 18 provides communications between control device 16 and remote monitoring center 20. In one or more embodiments, control device 16 may be part of premises device 14 or user interface device 12.

While control device 16 is illustrated as being a separate device from user interface device 12 and premises device 14, in one or more embodiments, control device 16 may be integrated with one or more user interface devices 12 and/or premises devices 14 and/or other entity/device located at premises associated with premises security system 11.

Example implementations, in accordance with one or more embodiments, of control device 16 discussed in the preceding paragraphs will now be described with reference to FIG. 2.

The system 10 includes a control device 16 that includes hardware 28 enabling the control device 16 to communicate with one or more entities in system 10 and to perform one or more functions described herein. The hardware 28 may include a communication interface 30 for setting up and maintaining at least a wired and/or wireless connection to one or more entities in system 10 such as remote monitoring center 20, premises device 14, user interface device 12, etc. Control device 16 may include one or more sound detectors 31 (collectively referred to as sound detector 31) that are configured to detect one or more sounds at the premises. In one or more embodiments, sound detector 31 may include one or more of a microphone, among other types of sound sensors.

In the embodiment shown, the hardware 28 of the control device 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Arrays) and/or ASICs (Application Specific Integrated Circuitry/Circuits) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the control device 16 further has software 40 stored internally in, for example, memory 38, or stored in external memory (e.g., database, storage array, network storage device, etc.) accessible by the control device 16 via an external connection. The software 40 may be executable by the processing circuitry 34. The processing circuitry 34 may be configured to control any of the methods and/or processes described herein and/or to cause such methods, and/or processes to be performed, e.g., by control device 16. Processor 36 corresponds to one or more processors 36 for performing control device 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to control device 16. For example, processing circuitry 34 of the control device 16 may include acoustic training unit 22 which is configured to perform one or more control device 16 functions described herein such as with respect to acoustic determinations and/or other actions during the acoustic model training phase. In another example, processing circuitry 34 of the control device 16 may include acoustic monitoring unit 23 which is configured to perform one or more control device 16 functions described herein such as with respect to acoustic monitoring and/or initiated actions and/or other actions performed during the monitoring phase using the acoustic model.

Figure 2:
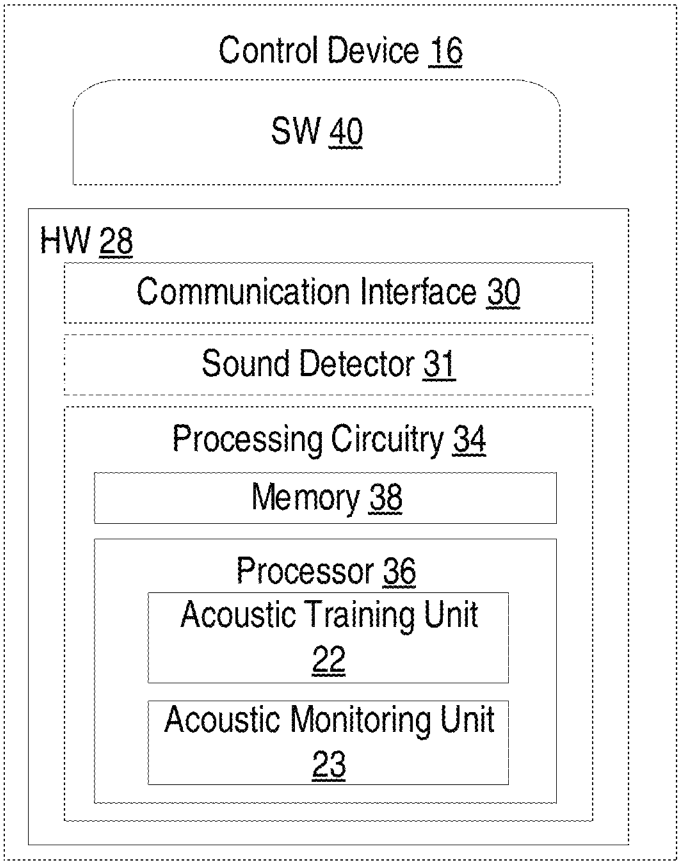
FIG. 2 is a block diagram of some devices in the system according to some embodiments of the present disclosure.

Although FIGS. 1 and 2 show acoustic training unit 22 and/or acoustic monitoring unit 23 as being within a processor, these units may be implemented such that a portion of each unit is stored in memory within the processing circuitry. In other words, the units may be implemented in hardware or in a combination of hardware and software within the processing circuitry. Further, while control device 16 is described as including an acoustic training unit 22 for performing, for example, the acoustic anomaly training functions described herein, one or more of these training functions may alternatively be performed by a remote server in network 18, remote monitoring center 20, cloud network and/or by another device in communication with premises security system 11 via network 18. Similarly, while control device 16 is described as including an acoustic monitoring unit 23 for determining, for example, an inference from detected sounds as described herein, one or more of these inferences (e.g., analysis) functions may alternatively be performed by a remote server in network 18, remote monitoring center 20, cloud network and/or by another device in communication with premises security system 11 via network 18.

Figure 3:
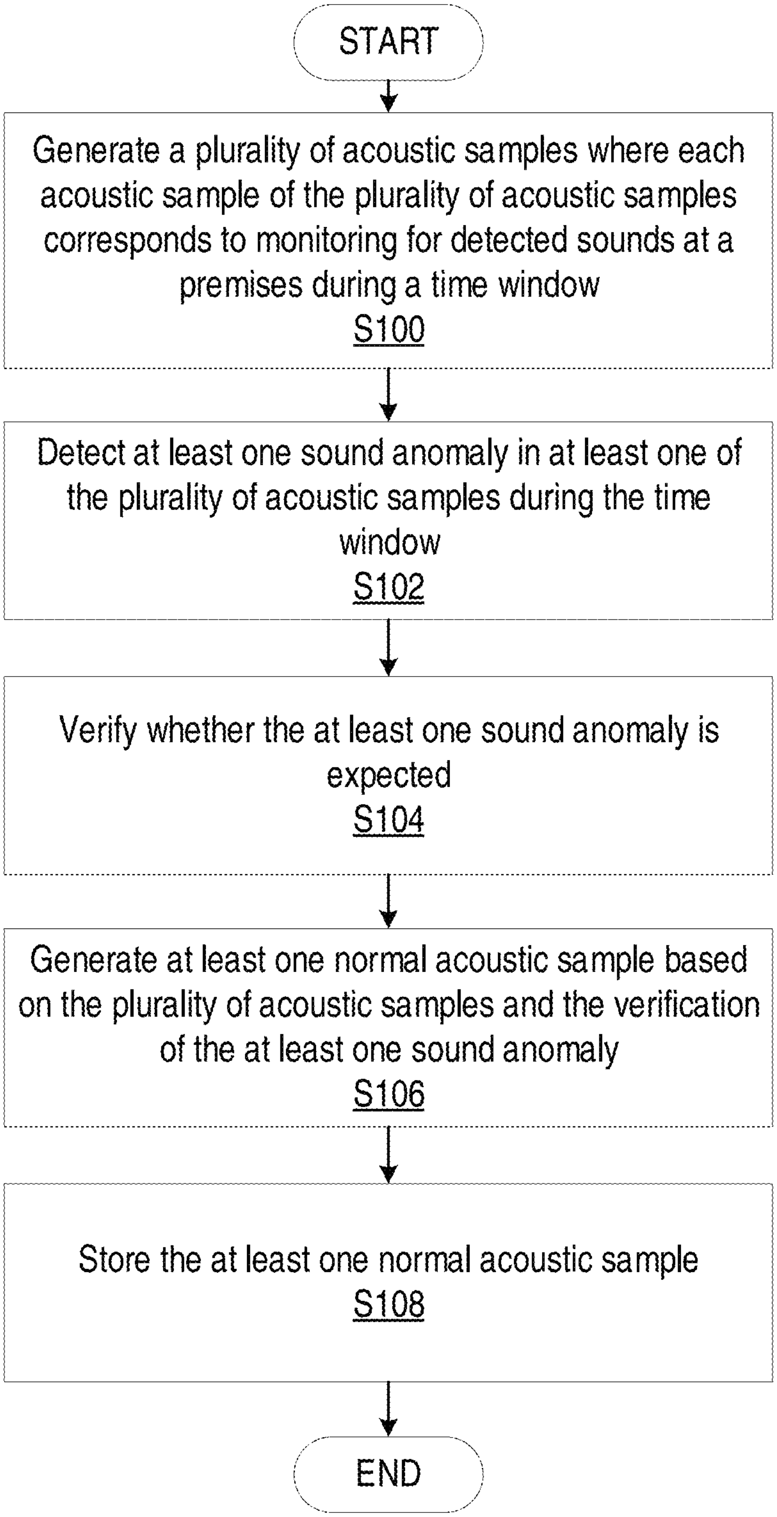
FIG. 3 is a flowchart of an example process in the control device according to some embodiments of the present disclosure.

FIG. 3 is a flowchart of an example process in a control device 16 according to one or more embodiments of the present invention. One or more blocks described herein may be performed by one or more elements of control device 16 such as by one or more of processing circuitry 34 (including the acoustic training unit 22), processor 36, etc. Control device 16 is configured to generate (Block S100) a plurality of acoustic samples where each acoustic sample of the plurality of acoustic samples is associated with monitoring for detected sounds at a premises during a time window. The control device 16 is configured to detect (Block S102) at least one sound anomaly in at least one of the plurality of acoustic samples during the time window. The control device 16 is configured to verify (Block S104) whether the at least one sound anomaly is expected. For example, the sound anomaly may be an outlier in that the acoustic sample includes a detected sound that is not consistent with other acoustic samples that correspond to fairly consistent background sounds of the premises. In another example, the sound anomaly is a lack of an expected sound. The control device 16 is configured to generate (Block S106) at least one "normal" acoustic sample (e.g., verified acoustic sample) based on the plurality of acoustic samples and the verification of the at least one sound anomaly. The control device 16 is configured to store (Block S108) the at least one "normal" acoustic sample such as part of the acoustic model that can be used for monitoring the premises. For example, the control device 16 may generate the acoustic model that includes a plurality of acoustic samples for the premises where some of the acoustic samples have been verified by the user and some acoustic samples are background noise/sounds that do not require user verification.

According to one or more embodiments, the time window corresponds to one of at least one week, at least one day, and at least one month. According to one or more embodiments, each of the plurality of acoustic samples is associated with a respective sample time stamp indicating at least one of a day and sample period associated with the acoustic sample, where each detected at least one sound anomaly is associated with a detection time stamp indicating at least one of a day and time when the sound anomaly was detected. According to one or more embodiments, the verification of the at least one sound anomaly includes: causing transmission of at least one message to at least one user to prompt the at least one user to classify the at least one sound anomaly; receiving a response to the at least one message indicating how to classify the at least one sound anomaly; and tagging the at least one sound anomaly with the indicated classification, the verification of the at least one sound anomaly being based at least on the indicated classification.

According to one or more embodiments, the at least one sound anomaly may be associated with at least one of: a sound of running water; a sound of door creak; a sound of window creak; a sound of at least one footstep; or a sound of a pet eating. However, the at least one anomaly is not limited to one of these examples as the premises security system 11 can flag additional types of sounds to be identified (classified) by one or more users for use during training and monitoring. Hence, the at least one sound anomaly may be associated with other sounds and is not limited to the examples described above. According to one or more embodiments, at least one of the plurality of acoustic samples is received from at least one premises device 14 at the premises where the at least one premises device 14 includes a sound detector 31 for detecting at least one sound. According to one or more embodiments, at least one sound detector 31 that is configured to detect at least one sound at the premises where at least one of the plurality of detected sounds is based on at least one sound detected by the at least one sound detector 31. For example, while control device 16 may generate one or more acoustic samples in Block S100, in one or more embodiments, one or more premises devices 14 that include at least one sound detector 31 may also generate one or more acoustic samples and provide the one or more acoustic samples to the control device 16 for further analysis in Block S102.

According to one or more embodiments, at least one of the plurality of acoustic samples is associated with a location stamp indicating the location of a sound detector 31 that monitored for detected sounds at the premises during the time window. The verification of at least one sound anomaly is based on the location stamp associated with at least one of the plurality of acoustic samples and at least one location stamp associated with the at least one sound anomaly. In one or more embodiments, the acoustic model is configured to include a plurality of acoustic samples (e.g., some of which were verified and some of which did not require verification) and the respective location associated with the premises device 14 that generated the acoustic sample.

According to one or more embodiments, the processing circuitry 34 is further configured to: detect at least one sound during monitoring of a premises, compare the at least one sound detected during the monitoring with the at least one normalized acoustic sample, determine whether the at least one sound detected during the monitoring is a first sound anomaly based on the comparison, and initiate an alert based on the determination that the at least one sound is the first sound anomaly.

Figure 4:
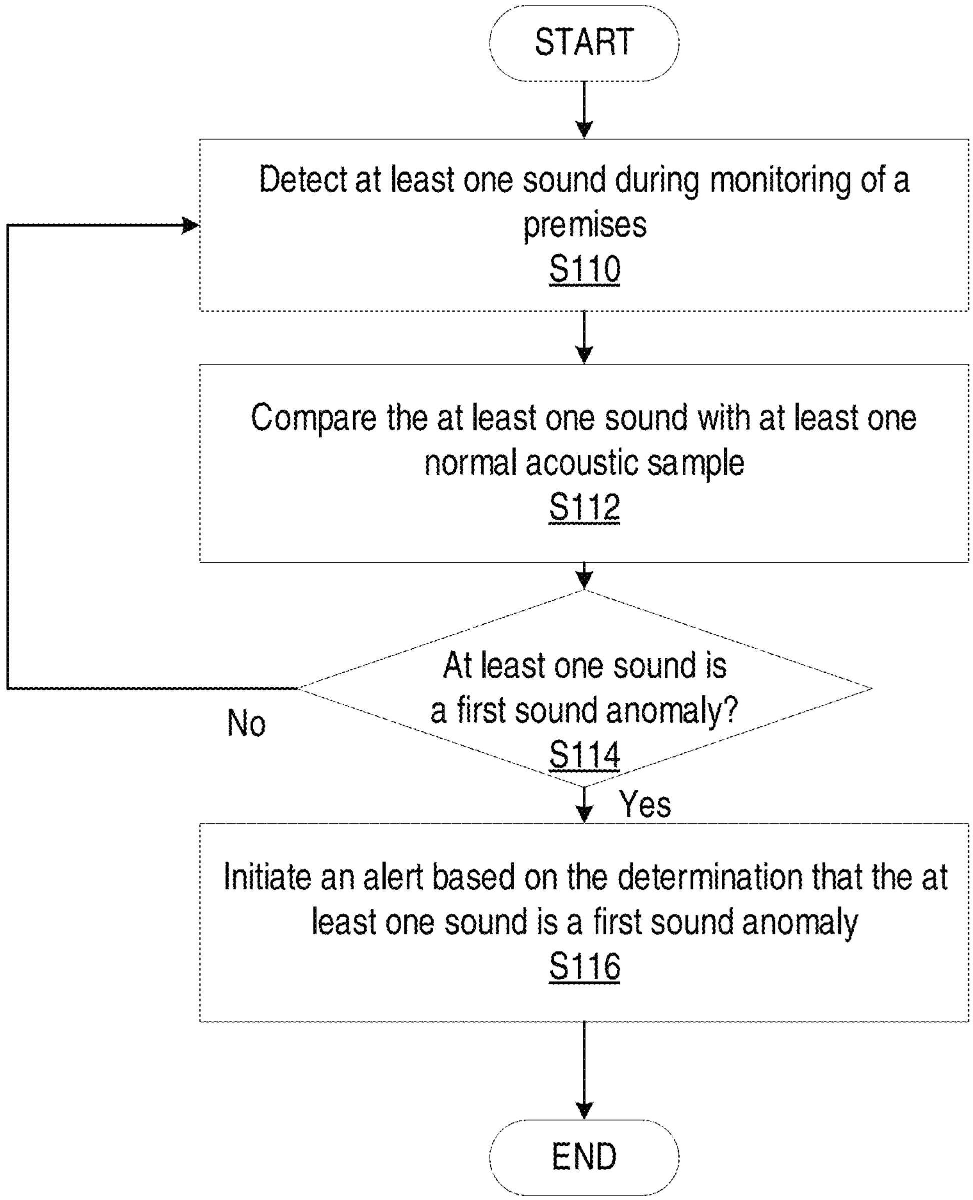
FIG. 4 is a flowchart of another example process in the control device according to some embodiments of the present disclosure.

FIG. 4 is a flowchart of an example process in a control device 16 according to one or more embodiments of the present invention. One or more blocks described herein may be performed by one or more elements of control device 16 such as by one or more of processing circuitry 34 (including the acoustic monitoring unit 23), processor 36, etc. Control device 16 is configured to detect (Block S110) at least one sound during monitoring of a premises.

Alternatively or in addition to detecting at least one sound, the control device 16 may receive one or more acoustic samples from one or more premises device 14 where the one or more acoustic samples were generated during the monitoring of the premises. Control device 16 is configured to compare (Block S112) the at least one sound (e.g., captured in an acoustic sample) with at least one "normal" acoustic sample (e.g., verified acoustic sample). Control device 16 is configured to determine (Block S114) whether the at least one sound is a first sound anomaly based on the comparison. Control device 16 is configured to initiate (Block S116) an alert based on the determination that the at least one sound is the first sound anomaly. If the at least one sound is determined to not be a sound anomaly, the process may revert to Block S110 and/or monitor for other sounds. In some embodiments, the database may be updated based on the detected sound. For example, the acoustic model may be updated based on the detected sound.

According to one or more embodiments, the at least one "normal" acoustic sample (e.g., verified acoustic sample) is based at least on a plurality of acoustic samples and verification of at least a second sound anomaly detected during a time window. According to one or more embodiments, the time window occurs during a training phase and corresponds to one of: at least one week, at least one day, and at least one month. According to one or more embodiments, the at least one "normal" acoustic sample (e.g., verified acoustic sample) is associated with at least one sample time stamp indicating at least one of a day and sample period. The first sound anomaly is associated with at least one detection time stamp indicating at least one of a day and time when the first sound anomaly was detected, and the comparison is based at least on the detection time stamp and sample time stamp.

According to one or more embodiments, the first sound anomaly may be associated with at least one of: a sound of running water; a sound of door creak; a sound of window creak; a sound of at least one footstep; or a sound of a breaking window. According to one or more embodiments, at least one sound detector that is configured to detect at least one sound at the premises where the at least one sound detected during monitoring of the premises was detected by the at least one sound detector 31. According to one or more embodiments, the at least one sound detected during the monitoring of the premises is received from at least one premises device 14 at the premises where the at least one premises device 14 includes a sound detector 31 for detecting at least one sound.

According to one or more embodiments, the processing circuitry 34 is further configured to generate a plurality of acoustic samples, each acoustic sample of the plurality of acoustic samples being associated with monitoring for detected sounds at a premises during a time window of a training phase, detect at least one sound anomaly in at least one of the plurality of acoustic samples during the time window, verify whether the at least one sound anomaly is expected, generate the at least one "normal" acoustic sample (e.g., verified acoustic sample) based on the plurality of acoustic samples and the verification of the at least one sound anomaly, and store the at least one "normal" acoustic sample.

Figure 5:
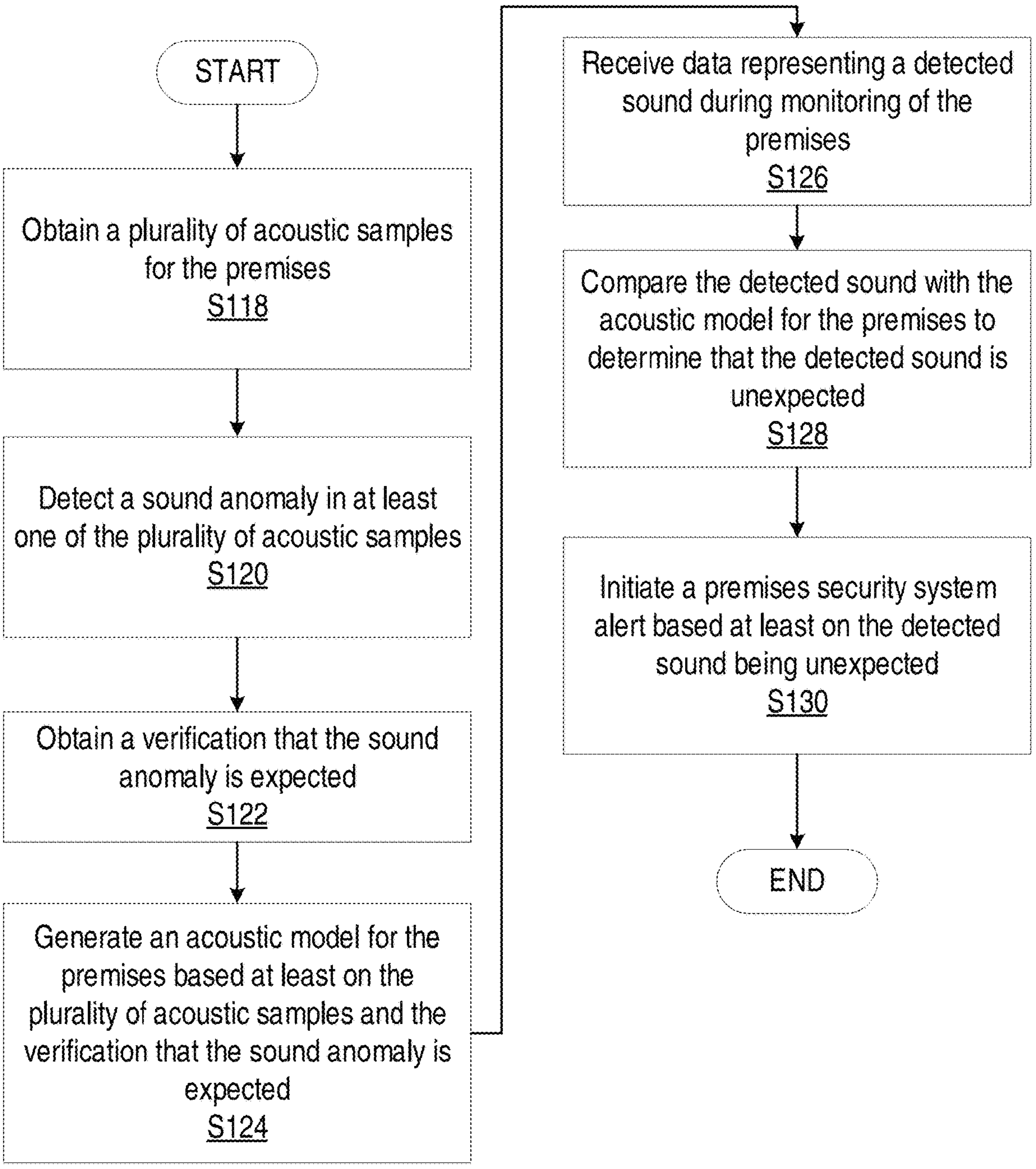
FIG. 5 is a flowchart of another example process in the control device according to some embodiments of the present disclosure.

FIG. 5 is a flowchart of an example process in a control device 16 according to one or more embodiments of the present invention. One or more blocks described herein may be performed by one or more elements of control device 16 such as by one or more of processing circuitry 34 (including the acoustic monitoring unit 23), processor 36, etc. Control device 16 is configured to obtain (Block S118) a plurality of acoustic samples for the premises, as described herein. Control device 16 is configured to detect (Block S120) a sound anomaly in at least one of the plurality of acoustic samples, as described herein. Control device 16 is configured to obtain (Block S122) a verification that the sound anomaly is expected, as described herein.

Control device 16 is configured to generate (Block S124) an acoustic model for the premises based at least on the plurality of acoustic samples and the verification that the sound anomaly is expected, as described herein. Control device 16 is configured to receive (Block S126) data representing a detected sound during monitoring of the premises, as described herein. Control device 16 is configured to compare (Block S128) the detected sound with the acoustic model for the premises to determine that the detected sound is unexpected, as described herein. Control device 16 is configured to initiate (Block S130) a premises security system alert based at least on the detected sound being unexpected, as described herein.

According to one or more embodiments, the plurality of acoustic samples are obtained during a training time window of one of: at least one week, at least one day, or at least one month.

According to one or more embodiments, each of the plurality of acoustic samples is associated with a respective sample time stamp indicating at least one of a day or sample period associated with the acoustic sample, and where the sound anomaly is associated with a detection time stamp indicating at least one of a day or time when the sound anomaly was detected.

According to one or more embodiments, the processing circuitry 34 is further configured to compare the detection time stamp and sample time stamp to determine whether the sound anomaly is expected or unexpected. According to one or more embodiments, the processing circuitry 34 is further configured to: cause transmission of at least one message to at least one user to prompt the at least one user to classify the sound anomaly as expected or unexpected, receive a response to the at least one message indicating a classification of the at least one sound anomaly, and tag the sound anomaly with the classification, and where the acoustic model is generated based at least on the classification.

According to one or more embodiments, the sound anomaly is associated with at least one of: a sound of running water, a sound of door creak, a sound of window creak, a sound of at least one footstep, a sound of a breaking window, or a sound of a pet eating. According to one or more embodiments, at least one of the plurality of acoustic samples is obtained from at least one premises device 14 at the premises where the at least one premises device 14 comprises a sound detector 31 for detecting sound. According to one or more embodiments, at least one of the plurality of acoustic samples comprises a location stamp indicating a location in the premises where the acoustic sample was generated during the time window, and where the processing circuitry 34 is further configured to generate the acoustic model based at least on the location stamp associated with at least one of the plurality of acoustic samples. According to one or more embodiments, the processing circuitry 34 is further configured to: determine that the acoustic model for the premises indicates that a particular sound is expected in the premises, determine that the particular sound has not been detected during monitoring of the premises, and initiate an additional premises security system alert based at least on the particular sound not being detected during monitoring of the premises.

Figure 6:
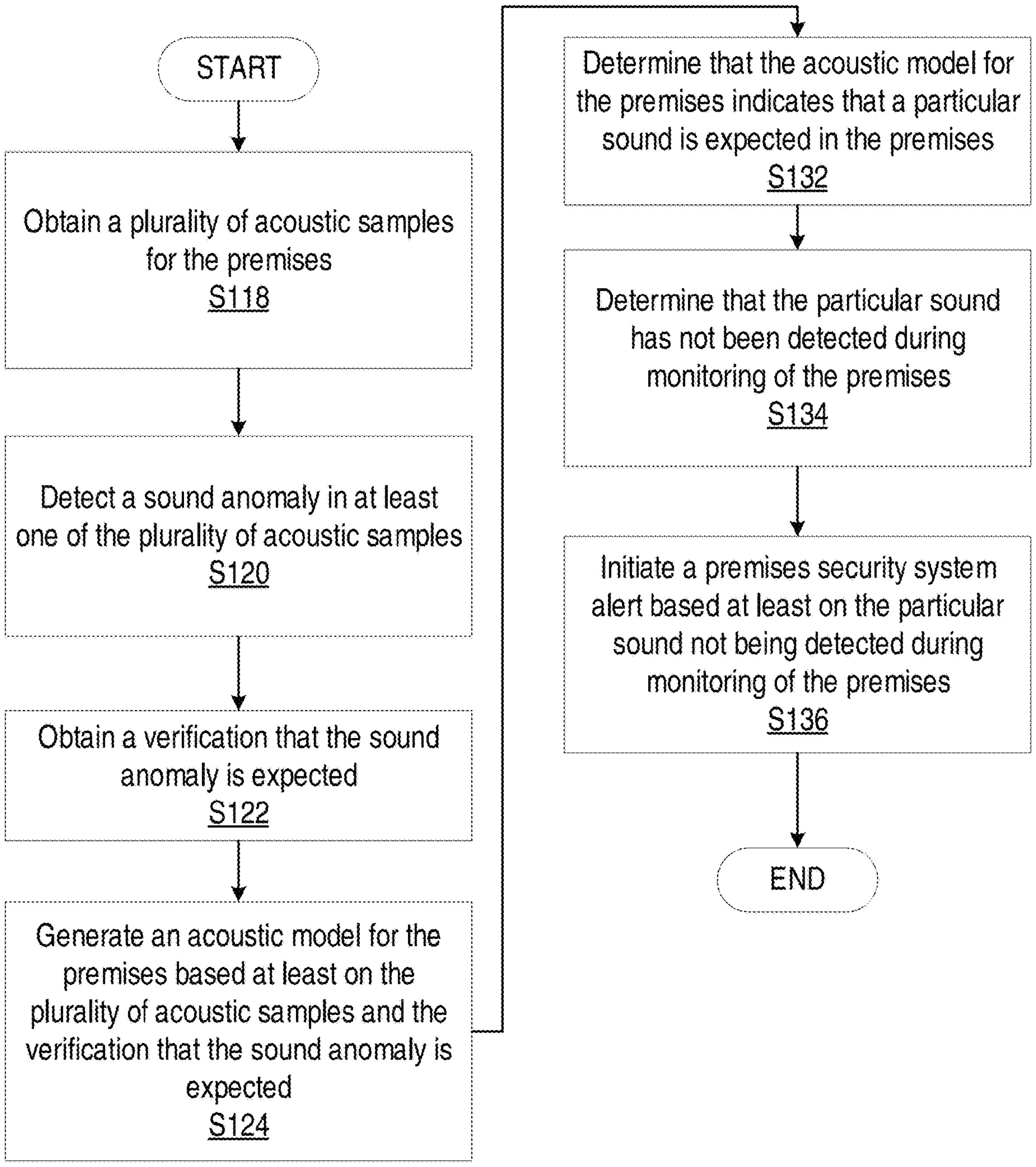
FIG. 6 is a flowchart of another example process in the control device according to some embodiments of the present disclosure.

FIG. 6 is a flowchart of another example process in a control device 16 according to one or more embodiments of the present invention. One or more blocks described herein may be performed by one or more elements of control device 16 such as by one or more of processing circuitry 34 (including the acoustic monitoring unit 23), processor 36, etc. Control device 16 is configured to perform Blocks S118-S124 as described above with respect to FIG. 5. Control device 16 is further configured to determine (Block S132) that the acoustic model for the premises indicates that a particular sound is expected in the premises, as described herein. For example, control device 16 may receive data indicating the fireplace is ON (e.g., crackling sounds of fire) where the acoustic model for the premises indicates that human activity (e.g., talking, walking sounds, etc.) is expected in the premises while the fireplace is ON. Control device 16 is configured to determine (Block S134) that the particular sound has not been detected during monitoring of the premises, as described herein. Continuing the example above, the sounds of human activity are expected according to the acoustic model but such sounds are not detected. Control device 16 is configured to initiate (Block S136) a premises security system alert based at least on the particular sound not being detected during monitoring of the premises, as described herein.

According to one or more embodiments, at least one of the plurality of acoustic samples is obtained from at least one premises device at the premises, the at least one premises device 14 comprising a sound detector for detecting sound.

Having generally described arrangements for acoustic model training/generation and monitoring, some functions and processes are provided as follows, and which may be implemented by the control device 16 and/or other entity in system 10. One or more functions described below may be performed by one or more of control device 16, processing circuitry 34, processor 36, acoustic training unit 22, acoustic monitoring unit 23, etc.

In one or more embodiments, a plurality of acoustic samples such as a "normal" audio pattern/fingerprint (e.g., normal/verified acoustic samples) and other acoustic samples (e.g., background noise samples) are set or determined for a given home/premises such as during a training phase. This is accomplished by, for example, generating acoustic samples over a predefined timeframe (i.e., time window or training window) such as two weeks. When an audio anomaly is detected in the training window—the premises security system 11 (e.g., control device 16) may push a recording of the sound (e.g., acoustic sample(s) of the sound) to the homeowner/user (e.g., user interface device 12*c*) for verification if the sound were "normal"/"expected" or "potential issue"/"unexpected," i.e., to classify the sound into a predefined category such as a normal category/expected category or "potential issue" category/unexpected category. As used herein, "normal" audio pattern or acoustic sample may refer to baseline acoustic sample(s) of the home that represents a set of sounds (e.g., verified anomalies, etc.) that are determined to be non-actionable from a security/alarming perspective, e.g., loud air conditioners, box fans, washing machines, etc., where this baseline acoustic samples may be generated/determined by the training described herein and may be part of the acoustic model that is used during the monitoring phase. Hence, these verified acoustic samples become part of the acoustic model as do the acoustic samples that did not require verification (e.g., background noise acoustic samples or those with detected sounds below a predefined threshold). Afterwards, during the monitoring phase, inferences may be made by comparing the acoustic model (including the baseline acoustic sample(s)) to detected sounds to determine if the detected sound "falls outside" of the baseline acoustic sample(s) such as to trigger a premises security system 11 action or event. In one or more embodiments, the normal acoustic sample(s) includes acoustic sounds occurring in the premise from daily or "normal" activity.

This training data allows the premises security system 11 to build a detailed fingerprint map/acoustic model of the home that may include time stamps, locations stamps, etc., such that, for example, some acoustic samples are specific to one or more locations in the premises. That is, the training phase builds and/or determines a detailed acoustic model (including acoustic samples) of the premises that is able to account for infrequent sounds such as dishwashers, pool pumps, etc. In other words, over a training period (e.g., time window or training window) the control device 16 learns which sounds at the premises are, for example, expected, normal, etc.

The premises security system 11 after the initial training period/phase, such as during a monitoring period/phase, is configured to alert a user of sound anomalies detected in the house/premises. That is, the acoustic model (including normal/verified acoustic sample(s)) is used to determine/infer anomalies in detected sounds in the premises/house during monitoring of the premises by premises security system 11. An example is water running where the running water is unexpected based on the comparison with the acoustic model. An alert may be initiated by the control device 16 based on the determination that the detected sound is a sound anomaly. In one or more embodiments, the homeowner would receive a push notification allowing them to verify the sound as expected (i.e., a sound classified as expected) and if so, fed into the fingerprint database. If the sound is flagged as "unexpected," the homeowner and/or control device 16 can could alert the remote monitoring center 20 to intervene by sending help and/or may initiate another action associated with the premises security system 11.

The present disclosure provides smart security by generating an acoustic model for one or more portions of the premises in order to allow for the determination of sound anomalies, and in the case of the homeowner not being present at the premises, the remote monitoring center 20 could dispatch first responders to the premises.

Longer term databases of acoustic samples that are aggregated across homes/premises could be generated by control device 16, remote monitoring center 20, or other entity in system 10, to help further refine acoustic samples that "sense" audio that can be characterized over time as: burglaries, fires, leaks, etc. That is, an aggregated acoustic model may be generated based on a plurality of acoustic models associated with a plurality of premises security systems 11.

The teachings described herein help augment the sensors (e.g., premises devices 14) that are in place and close gaps where there are no sensors—windows, doors, attics, etc. or places where sensors cannot be placed and/or are typically not placed within the premises.

Hence, the audio/acoustic model within the context of the premises security system 11 advantageously provides one or more of: increases the accuracy of triggered alerts, helps monitor blind spots in other premises devices 14, allows for monitoring of events that may be hard to detect or are undetectable with existing premises devices 14 (e.g., water leak, etc.), among other advantages described herein.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A control device for a premises security system that is configured to monitor a premises using a plurality of premises devices, the control device comprising:

at least one processor; and at least one non-transitory computer-readable medium storing a plurality of instructions that, when executed by the at least one processor, cause the at least one processor to:

generate a trained acoustic model for the premises by at least: obtaining a plurality of acoustic samples recorded at the premises;

detecting a sound anomaly in at least one of the plurality of acoustic samples; obtaining a verification that the sound anomaly is expected; and training an acoustic model based at least on the plurality of acoustic samples and at least by incorporating, into the acoustic model, at least one verified acoustic sample comprising the sound anomaly in response to the verification that the sound anomaly is expected; and implement the trained acoustic model for monitoring the premises, the trained acoustic model comprising at least one unverified acoustic sample and the at least one verified acoustic sample.

2. The control device of claim 1, wherein the plurality of instructions is further configured to cause the at least one processor to:

receive data representing a detected sound during monitoring of the premises;

determine whether the detected sound corresponds to a verified anomaly of the acoustic model; and initiate a premises security system alert based at least on the detected sound not corresponding to the verified anomaly.

3. The control device of claim 1, wherein:
each of the plurality of acoustic samples is associated with a respective sample time stamp indicating at least one of a day or a sample period associated with the acoustic sample; and
the sound anomaly is associated with a detection time stamp indicating at least one of a day or a time when the sound anomaly was detected.

4. The control device of claim 3, wherein the plurality of instructions is further configured to cause the at least one processor to compare the detection time stamp and the sample time stamp to determine whether the sound anomaly is expected or unexpected.

5. The control device of claim 1, wherein the plurality of instructions is further configured to cause the at least one processor to:
cause transmission of at least one message to at least one user to prompt the at least one user to classify the sound anomaly as expected or unexpected;
receive a response to the at least one message indicating a classification of the sound anomaly;
tag the sound anomaly with the classification; and
wherein the acoustic model is generated based at least on the classification.

6. The control device of claim 1, wherein the sound anomaly is associated with at least one of:
a sound of running water;
a sound of door creak;
a sound of window creak;
a sound of at least one footstep;
a sound of a breaking window; or
a sound of a pet eating.

7. The control device of claim 1, wherein at least one of the plurality of acoustic samples is obtained from at least one premises device at the premises, the at least one premises device comprising a sound detector for detecting sound.

8. The control device of claim 1, wherein at least one of the plurality of acoustic samples comprises a location stamp indicating a location in the premises where the acoustic sample was generated during a time window; and
wherein the plurality of instructions is further configured to cause the at least one processor to generate the acoustic model based at least on the location stamp associated with at least one of the plurality of acoustic samples.

9. The control device of claim 1, wherein the plurality of instructions is further configured to cause the at least one processor to:
determine that the acoustic model for the premises indicates that a particular sound is expected in the premises;
determine that the particular sound has not been detected during monitoring of the premises; and
initiate an additional premises security system alert based at least on the particular sound not being detected during monitoring of the premises.

10. A method implemented by a control device for a premises security system that is configured to monitor a premises using a plurality of premises devices, the method comprising:
generating a trained acoustic model for the premises by at least:
obtaining a plurality of acoustic samples recorded at the premises;
detecting a sound anomaly in at least one of the plurality of acoustic samples;
obtaining a verification that the sound anomaly is expected; and
training an acoustic model based at least on the plurality of acoustic samples and at least by incorporating, into the acoustic model, at least one verified acoustic sample comprising the sound anomaly in response to the verification that the sound anomaly is expected; and
implementing the trained acoustic model for monitoring the premises, the trained acoustic model comprising at least one unverified acoustic sample and the at least one verified acoustic sample.

11. The method of claim 10, further comprising:
receiving data representing a detected sound during monitoring of the premises;
determining whether the detected sound corresponds to a verified anomaly of the acoustic model; and
initiating a premises security system alert based at least on the detected sound not corresponding to the verified anomaly.

12. The method of claim 10, wherein:
each of the plurality of acoustic samples is associated with a respective sample time stamp indicating at least one of a day or a sample period associated with the acoustic sample; and
the sound anomaly is associated with a detection time stamp indicating at least one of a day or a time when the sound anomaly was detected.

13. The method of claim 12, further comprising comparing the detection time stamp and the sample time stamp to determine whether the sound anomaly is expected or unexpected.

14. The method of claim 10, further comprising:
cause transmission of at least one message to at least one user to prompt the at least one user to classify the sound anomaly as expected or unexpected;
receive a response to the at least one message indicating a classification of the sound anomaly;
tag the sound anomaly with the classification; and
wherein the acoustic model is generated based at least on the classification.

15. The method of claim 10, wherein the sound anomaly is associated with at least one of:
a sound of running water;
a sound of door creak;
a sound of window creak;
a sound of at least one footstep;
a sound of a breaking window; or
a sound of a pet eating.

16. The method of claim 10, wherein at least one of the plurality of acoustic samples is obtained from at least one premises device at the premises, the at least one premises device comprising a sound detector for detecting sound.

17. The method of claim 10, wherein at least one of the plurality of acoustic samples comprises a location stamp indicating a location in the premises where the acoustic sample was generated during a time window; and
the method further comprising generating the acoustic model based at least on the location stamp associated with at least one of the plurality of acoustic samples.

18. The method of claim 10, further comprising:
determining that the acoustic model for the premises indicates that a particular sound is expected in the premises;
determining that the particular sound has not been detected during monitoring of the premises; and initiating an additional premises security system alert based at least on the particular sound not being detected during monitoring of the premises.

19. A control device for a premises security system that is configured to monitor a premises using a plurality of premises devices, the control device comprising:

at least one processor; and at least one non-transitory computer-readable medium storing a plurality of instructions that, when executed by the at least one processor, cause the at least one processor to:

generate a trained acoustic model for the premises by at least:

obtaining a plurality of acoustic samples recorded at the premises;

detecting a sound anomaly in at least one of the plurality of acoustic samples;

obtaining a verification that the sound anomaly is expected; and training an acoustic model for the premises based at least on the plurality of acoustic samples and the verification that the sound anomaly is expected, the training comprising incorporating, into the acoustic model, at least one verified acoustic sample comprising the sound anomaly in response to the verification, the trained acoustic model comprising at least one unverified acoustic sample and the at least one verified acoustic sample;

determine that the trained acoustic model for the premises indicates that a particular sound is expected in the premises;

determine that the particular sound has not been detected during monitoring of the premises; and initiate a premises security system alert based at least on the particular sound not being detected during monitoring of the premises.

20. The control device of claim 19, wherein at least one of the plurality of acoustic samples is obtained from at least one premises device at the premises, the at least one premises device comprising a sound detector for detecting sound.

* * * * *